3,218,314
CARBOALKOXYVINYL ETHERS OF A
POLYSACCHARIDE
Lee A. Miller, Kirkwood, Mo., assignor to Monsanto Company, a corporation of Delaware
No Drawing. Original application Apr. 5, 1961, Ser. No. 100,813, now Patent No. 3,100,794, dated Aug. 13, 1963. Divided and this application Feb. 18, 1963, Ser. No. 259,395
7 Claims. (Cl. 260—231)

This application is a division of copending application 100,813, filed April 5, 1961, now Patent No. 3,100,794 for "Esters of Acetylenic Acids."

The present invention relates to esters of acetylenic acids and more particularly provides new and valuable esters of propiolic acid, a method for preparing the same, and carboalkoxyvinyl ethers of polysaccharides derived therefrom. This invention also provides a method of treating polysaccharide materials to enhance the properties thereof.

According to the invention, long chain alkyl propiolates are prepared by the reaction of a higher alkanol with propiolic acid or an acyl halide or an anhydride thereof, the reaction with, e.g., propiolic acid, proceeding as follows:

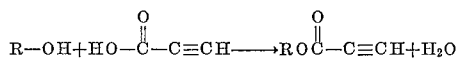

in which R is an alkyl radical of from 8 to 30 carbon atoms. The higher alkanols used may be primary, secondary, or tertiary alcohols.

Examples of propiolates provided by the invention and the long chain alkyl alcohols from which they are prepared are:

1-octyl propiolate from 1-octanol
2-ethylhexyl propiolate from 2-ethylhexanol
2-octyl propiolate from 2-octanol
1-nonyl propiolate from 1-nonanol
2,4,6-trimethyl-1-hexyl propiolate from oxo-1-decanol
1-decyl propiolate from 1-decanol
1-undecyl propiolate from 1-undecanol
1-dodecyl propiolate from 1-dodecanol
2-decyl propiolate from 2-decanol
4-tridecyl propiolate from 4-tridecanol
2-tetradecyl propiolate from 2-tetradecanol
Oxo-1-tridecyl propiolate from oxo-2-tridecanol
Oxo-1-tridecyl propiolate from oxo-1-tridecanol
1-pentadecyl propiolate from 1-pentadecanol
2-hexadecyl propiolate from 2-hexadecanol
1-heptadecyl propiolate from 1-heptadecanol
4-heptadecyl propiolate from 4-heptadecanol
1-octadecyl propiolate from 1-octadecanol
Oxo-1-heptadecyl propiolate from oxo-1-heptadecanol
1-nonadecyl propiolate from 1-nonadecanol
1-eicosyl propiolate from 1-eicosanol
Oxo-1-heneicosyl propiolate from oxo-1-heneicosanol
Heneicosyl propiolate from heneicosanol
Docosyl propiolate from docosanol
Tetracosyl propiolate from tetracosanol
Octacosyl propiolate from octacosanol
Tricontyl propiolate from tricontanol Owing to the ready availability of starting alcohols, of particular interest are the primary alkyl propiolates having from 8 to 30 carbon atoms in the alkyl carbon chain. Reaction of the long chain alkyl alcohol with the propiolic acid or acyl halide or anhydride thereof takes place readily by simply contacting the propiolic acid compound with the alcohol at ordinary or increased temperature and in the presence of an inert diluent or solvent. Advantageously, when propiolic acid is used, reaction is effected at temperatures of from 50–120° C. and heating within this temperature range is conducted until the desired extent of esterification has occurred. Using the propiolyl halide, that is, propiolyl chloride, bromide, iodide or fluoride, optimum conditions include operation at temperatures which may be as low as, say, −10° C., that is, extraneous heating will generally be unnecessary; instead, cooling may be employed. Since formation of the ester occurs by reaction of 1 mole of the alcohol with 1 mole of the propiolic acid compound, the two reactants are advantageously employed in such stoichiometric proportions. However, an excess of the acidic compound may be employed, since any unreacted acid, anhydride or halide may be readily removed from the reaction product. The presence of an inert diluent or solvent and operation at a temperature which is below 150° C. is advantageous in avoiding side reactions, for example, polymerization; operation in this manner permits substantial limitation of the reaction to esterification, rather than to other reactions which could be expected to occur with a highly active, triple bonded acidic compound and the long chain alkyl alcohol. The long chain alkyl propiolate esters of this invention may also be prepared by transesterification of a lower alkyl propiolate with a long chain alkyl alcohol. For example, by refluxing methyl propiolate with tetracosyl alcohol, tetracosyl propiolate is prepared.

Inert liquid diluents which are useful for the present purpose are liquid hydrocarbons generally, halogenated hydrocarbons, ethers or ketones, for example, benzene, toluene, xylene, hexane, petroleum spirits, dichlorobenzene, ethylene dichloride, carbon tetrachloride, tetrachlorohexane, dioxane, isopropyl ether, acetone, butanone, etc. The solvent or diluent, of course, serves to facilitate uniform distribution of the reactants throughout the reaction medium. When reacting a propiolyl chloride with the long chain alkanol, it is preferred to employ a solvent or diluent which minimizes the tendency of the hydrogen halide by-product to react with the triple bond of the propiolic acid compound. In this connection the solvent or diluent is selected on the basis of being the least compatible or having the poorest solvency for hydrogen halide. The preferred solvents or diluents for this purpose may be the cycloalkanes, for example, cyclohexane, cyclopentane or alkyl-substituted cycloalkanes, etc., and the halogenated hydrocarbons.

When using propiolic acid as a starting material in the esterification reaction, water is formed as a by-product material. Since reaction is of the equilibrium type, it is preferred that the by-product water be removed continuously during the course of the reaction in order to have the equilibrium shift in the desired direction. The solvent or diluent employed in the reaction may be selected on the basis that it will form an azeotrope with water or that it boils above water, and thus the temperature of reaction may be maintained at a level which facilitates removal of the water without affecting the solvent or diluent. Considering the prerequisites of a solvent or diluent, generally any organic material which is non-reactive with either the reactants or the product materials may be employed.

I have also found that when effecting the reaction with the free acid or acid anhydride as the acid component, it is advantageous to operate in the presence of an acidic material as catalyst. Acids which are useful for this purpose are for example, the mineral acids, such as sulfuric, phosphoric or chlorosulfonic acid, acidic salts such as ferric chloride, or magnesium bisulfate, organic sulfonic acids such as benzenesulfonic acid, 4-toluenesulfonic acid, etc.

The presently provided long chain alkyl esters of propiolic acid are stable, well-characterized compounds which are advantageously employed for a variety of industrial and agricultural purposes. For example, as will be hereinafter shown, these compounds are of use as highly efficient sizing and paper treatment chemicals. They are useful as soil fungicides. They are useful intermediates for preparing carboalkoxyvinyl ethers of polysaccharides, e.g., starch, cellulose, etc.

The compounds of this invention thus provide a method for modifying the chemical structure of polysaccharide materials to enhance the properties thereof for a variety of purposes where moisture is liable to be encountered and where modification of properties by moisture is to be avoided. The treated polysaccharide products may be described as a carboalkoxyvinyl ether of the polysaccharide wherein the long chain alkyl propiolate ester adds to the polysaccharide through a hydroxyl group thereof, as illustrated by the following equation:

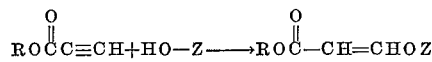

wherein R is the long chain alkyl radical having from 8 to 30 carbon atoms, and Z is the residue of the polysaccharide treated with the propiolate ester.

The present invention is particularly of interest in the modification of properties of high molecular weight polyols such as polysaccharides. The reaction of the invention will proceed readily with any polysaccharide such as all forms of cellulose, starch, cellodextrins, pectic substances, etc. The various types of cellulose suitable, in addition to those mentioned in the examples include natural fibers, such as jute, ramie, linen, etc., regenerated cellulose such as viscose, or even partially substituted derivatives containing free hydroxyl groups such as methyl cellulose or ethyl cellulose. The starch used may be of root origin, such as tapioca, or from a grain such as wheat or corn. Other useful polysaccharides are the synthetic, polyhydroxylated polymers such as polyvinyl alcohol or partially hydrolyzed polyvinyl acetate. Here, there is generally desired not a total change in physical appearance and other properties but an improvement of some characteristics for the purpose of fitting the polymeric material to a particular utility. In this case, the cellulosic material is caused to react with only a sufficient quantity of the long chain alkyl propiolate to react with from, say 0.1% to 3.0% of the hydroxyl groups. The polysaccharide-propiolate adduct thus obtained retains the same fiber structure as that characterizing the original cellulosic material prior to reaction with the alkyl propiolate; but as shown in the examples, there is evidenced a change in other properties of the cellulose. Similarly, for example, by reaction of starch with the long chain alkyl propiolate a change in the normal characteristics of the starch is effected. Such modified starches are highly desirable as sizing agents, for example, for papers and textile fabrics in that material sized therewith are rendered substantially wash proof and impermeable to dirt and ink and are enhanced in feel and texture. Also, the natural gums and resins of the carbohydrate class, for example, gum arabic or pectin, are converted by reaction with the long chain alkyl esters into products having improved protective colloidal effects and adhesive properties.

Reaction of the long chain alkyl propiolate ester with the polyol to give the presently provided addition products is generally conducted in the presence of a basic catalyst and in the presence of an inert liquid diluent or solvent. Preferably, the basic catalyst is organic. This is particularly desirable when the reaction is effected in the presence of a diluent. Examples of presently useful basic catalysts are, for example, the heterocyclic nitrogen bases, such as N-methylmorpholine, pyridine, quinoline, N-ethyl-piperidine, picoline, quinoxaline, 4-methylpyrimidine, or N-phenylpyrazole; the teritiary amines such as triethylamine, triamylamine, N,N-dimethylaniline and N-benzyl-N-methylaniline; polyamines such as triethylene diamine; quaternary ammonium compounds such as benzyl trimethylammonium methoxide or tetrabutyl ammonium butoxide; alkali metal alkoxides such as sodium or potassium methoxide or propoxide, etc. The alkali metal hydroxides, for example, sodium, potassium or lithium hydroxides may also be used. The use of a diluent or solvent in the reaction will depend upon the nature of the reactants as well as upon the reaction conditions which are employed. When using a liquid long chain alkyl propiolate, a diluent need not be used unless the ester and/or the polyol are extremely reactive. In that case, the use of an inert diluent will serve to moderate the reaction. Since essentially all reactions of organic compounds are influenced with respect to relative rates and extent of reaction by structural variations in the reactants, in this case, too, adjustment of temperature and catalysis must be made to secure control of the reaction time and extent of reaction. The quantity of the catalyst to be used also depends upon the nature of the long chain alkyl propiolate and the polyol which are used; obviously the more reactive reactants will require less catalyst than will the more sluggish reactants. Whether or not a diluent and the quantity thereof is used will likewise regulate the catalyst quantity. Also variable is the temperature at which reaction is effected; for, here again it must be taken into consideration the nature of the reactants, use of diluent and catalyst quantities. While some of the present addition reactions can be conducted at ordinary room temperature or even at decreased temperatures, say, at −10° C. to 10° C., in other instances heating of the reaction mixture will be needed. With the polymeric polyols, which compounds are generally less reactive than are the monomeric polyols, reaction is usually completed by curing at temperatures of say, from 60–160° C., polymers which are in contact with the long chain alkyl propiolate and basic catalyst. All of these variables, that is, catalyst, quantity, use of diluent, and temperature conditions can readily be arrived at by easy experimentation.

In reacting solid polymeric polyols such as cellulosic pulps, fibers, textiles, or paper, the material to be reacted may be immersed in or padded with a dilute solution of the long chain alkyl propiolate in a solvent and the thus treated material cured in a chamber in the presence of vapors of the basic catalyst, say N-methylmorpholine, at a temperature of from, say, 80–120° C. The addition reaction is more economically and at least as effectively conducted by treating the cellulosic material with an aqueous solution or with an aqueous emulsion containing from say, 0.5% to 3.0% by weight of the propiolate ester. As emulsifier, there may be present in the treating emulsion from, say, 0.02% to 0.2% by weight of an anionic or cationic emulsifier, for example, sodium dodecyl- or tridecylbenzenesulfonate, dodecylphenol, polyethyleneglycol ether or mixtures thereof, etc. The basic catalyst may or may not be present in the aqueous emulsion in a quantity of, say, from 0.001% to 0.10%. If not present in the emulsion, the catalyst may be introduced in the vapor state, for example, by passing nitrogen admixed with the volatilized catalyst over the polyol material after it has been padded with or immersed in the aqueous emulsion. Depending upon the nature and the quantity of reactants and of the catalyst, the treated product may be submitted to a curing step in order to assist complete reaction. This may be affected by heating at a temperature of from, say, 50° C. to 150° C. for a time which will vary from only a minute or so to several hours, the shorter heating period being used at the higher temperatures.

The reaction conditions for the preparation and methods of treatment of the polysaccharide materials may be varied widely from those specifically illustrated without departing from the scope of the invention. Reaction between the polysaccharide as, for example, cellulose, and octadecyl propiolate takes place in the presence of an alkaline catalyst. Various methods may be used for impregnating a polysaccharide with the alkaline catalyst. The method of soaking the cellulose or polysaccharide in an excess of the solution of catalyst followed by squeezing, pressing, or centrifuging to express liquid is preferred since this provides for more uniform distribution of catalyst throughout the polysaccharide. However, the exact amount of solvent and catalyst to be employed may be added to the polysaccharide and after thorough mixing the octadecyl propiolate may be added. Or, the desired reaction may be effected by mixing the octadecyl propiolate with the polysaccharide before or during the addition of the alkaline catalyst.

The invention is further illustrated by, but not limited to the following examples.

*Example 1*

A mixture consisting of 39.07 g. (0.3 mole) of 2-octanol, 23.1 g. (0.33 mole, 10% excess) of propiolic acid, 5 drops of sulfuric acid and 100 ml. of benzene was stirred at reflux for 24 hours. During this time, 4 ml. (79% of theory) of water had collected. The reaction mixture was allowed to cool and then washed with 100 ml. of 10% aqueous sodium bicarbonate and 100 ml. of water. The mixture was evaporated to remove the benzene solvent and subsequently distilled to give the substantially pure 2-octyl propiolate, B.P. 102–103°C./20 mm., $n_D^{25}$ 1.4318, which analyzed 72.55% carbon and 9.94% hydrogen as compared to 72.49% carbon and 9.96% hydrogen, the calculated values. Infrared analysis showed the following structures:

$\equiv$C—H at 3250 cm.$^{-1}$
CH at 2900–2800 cm.$^{-1}$
C$\equiv$CH at 2120 cm.$^{-1}$
C$=$O (ester) at 1700 cm.$^{-1}$
$CH_2$, $CH_3$ at 1450, 1370 cm.$^{-1}$
C—O—ester at 1250, 1120 cm.$^{-1}$
—C$\equiv$ at 758 cm.$^{-1}$
$(CH_2)_n$ at 722 cm.$^{-1}$

*Example 2*

A mixture consisting of 80.1 g. of tridecyl alcohol, 30.8 g. of propiolic acid, 5 drops of sulfuric acid, and 100 ml. of benzene was stirred under a Dean-Stark apparatus for 20 hours. At the end of this time, 7.4 ml. of water had collected in the water trap. The mixture was cooled, washed with 10% aqueous sodium bicarbonate, and then washed with 100 ml. of water. The benzene solvent was evaporated off leaving a residue which upon distillation gave 93.32 g. (92% yield) of the substantially pure tridecyl propiolate, B.P. 105–107° C./0.3 mm., $n_D^{25}$ 1.4477. The ester analyzed for 75.84% carbon and 11.35% hydrogen as compared to the calculated values of 76.14% carbon and 11.18% hydrogen. Infrared analysis substantiated the structure.

*Example 3*

A mixture of 48.4 g. of 1-hexadecanol, 15.4 g. of propiolic acid (10% excess) was added to 100 ml. of benzene and 5 drops of sulfuric acid and stirred at reflux for 24 hours. During this time 3.6 ml. of water by-product was collected in the trap of the apparatus. After removing the benzene solvent, crystals melting at 41–43° C. were noted. Distillation of the product gave 46.20 g. of substantially pure 1-hexadecyl propiolate, B.P. 166–169° C./0.4 mm. which analyzed 76.66% carbon and 11.43% hydrogen as against 77.49% carbon and 11.64% hydrogen, the calculated values.

*Example 4*

A mixture of 39.1 g. (0.3 mole) of 2-ethylhexanol, 23.1 g. (0.33 mole) of propiolic acid, 100 ml. of benzene, and 5 drops of sulfuric acid was stirred at reflux. There was obtained 5.9 ml. of water by-product. The product was washed with sodium bicarbonate solution and water as in the prior examples. Distillation of the residue gave 44.2 g. of 2-ethylhexyl propiolate, B.P. 103–104° C./20 mm., $n_D^{25}$ 1.4364, which analyzed 72.53% carbon and 10.16% hydrogen as compared to 72.49% carbon and 9.96% hydrogen, the calculated values.

*Example 5*

For this example, tests were made on paper treated with alkyl propiolate ester solutions as follows:

Four strips of 1½" x 5" Whatman number 1 filter paper were placed in each of three Petri dishes which dishes were then flooded with one of the following test chemical solutions:

(A) 0.49 g. of n-butyl propiolate
    15.84 g. of acetone
(B) 0.49 g. of 2-octyl propiolate
    15.84 g. of acetone
(C) Acetone only (control)

The impregnated strips were hung up to dry in air at room temperature for 15 minutes, and then exposed for 10 minutes to vapors of N-methylmorpholine entrained in nitrogen gas in a 12" x 12" x 4" box at room temperature, and finally dried in a forced air oven at 50° C. for 20 minutes. In order to test the nature of the chemical treatment of the paper strips, two strips from each treatment were then soaked for 1 minute in three changes of 100 ml. portions of fresh acetone and dried at room temperature. After curing of the strips for one-half hour at room temperature, the strips were supported horizontally on a ring and illuminated on the bottom. To each of the strips there was added 1 drop of Sheaffer's Skrip No. 232 Permanent Blue-Black ink. On the two sets of paper strips treated with solution A, one set being then washed in acetone, the other unwashed, the ink made immediate penetration of the paper to the extent that it made a circle of ¾" in diameter. On the strips treated with solution B, but not acetone washed, the ink penetrated over a period of one-half hour to a circle of only ⅓". On the strips treated with solution B and then soaked in acetone, the ink did not penetrate and dried without spreading on the surface of the paper. On the control strips, i.e., those treated with solution C, the ink penetrated and spread to a circle of 1" immediately upon addition of the drop of ink.

*Example 6*

The n-octadecyl propiolate ester was prepared by the transesterification of methyl propiolate with n-octadecanol as follows:

A mixture of 47.58 g. (0.566 mole) of methyl propiolate, 153.2 g. (0.566 mole) of recrystallized octadecyl alcohol, and 1.08 g. (0.0566 mole) of toluenesulfonic acid was refluxed for several hours at 100–110° C. until 18 ml. of methyl alcohol by product (78% of theory) was collected, leaving 185.0 g. of crude octadecyl propiolate as residue. A 48.2 g. portion of the crude product was distilled to remove methyl alcohol by-product, pot temperature to 116° C. leaving 47.7 g. of octadecyl propiolate product, M.P. 46–47° C. Infrared analysis of the product showed bands at 3.05 and 4.74μ indicative of HC$\equiv$C—R and there was no evidence of any —C$=$C— material.

*Example 7*

A carbooctadecyloxyvinyl ether of starch was prepared by adding n-octadecyl propiolate ester dissolved in dimethylbenzyl alcohol and emulsified with an "Arquad" emulsifying agent (a mixture of cationic quaternary ammonium salts of the alkyl trimethylammonium chloride and dialkyl methylammonium chloride types wherein the alkyl radical has from 8 to 18 carbon atoms) to a water emulsion of the starch, adjusting the pH to between 7.02 and 10.5, and heating the mixture at 90–95° C. for 15 minutes. The thus obtained starch product had improved water resistance as compared to untreated starch.

Example 8

A carbooctadecyloxyvinyl ether of cellulose was prepared by adding an aqueous emulsion of octadecyl propiolate dissolved in "Terpineol 318" (a mixture of water of insoluble tert-alcohols, α- and β-tertineol) to a cellulose pulp slurry under alkaline conditions. The thus treated cellulose pulp was pressed into paper sheets which were heated at 105° C. for 1 hour. A high level of sizing of the paper was thus obtained as measured by the ink flotation method.

The examples and description are intended to be illustrative only. Any modification of, or variation therefrom, which conforms to the spirit of the invention is intended to be included within the scope of the claims.

I claim:

1. A carboalkoxyvinyl ether of a polysaccharide having from 8 to 30 carbon atoms in the alkoxy radical.
2. A carboalkoxyvinyl ether of cellulose having from 8 to 30 carbon atoms in the alkoxy radical.
3. A carboalkoxyvinyl ether of starch having from 8 to 30 carbon atoms in the alkoxy radical.
4. A carbooctyloxyvinyl ether of cellulose.
5. A carbooctadecyloxyvinyl ether of cellulose.
6. A carboctadecyloxyvinyl ether of starch.
7. A method of treating polysaccharide materials which comprises reacting the polysaccharide with an alkyl propiolate having from 8 to 30 carbon atoms in the alkyl radical in the presence of an alkaline catalyst.

No references cited.

WILLIAM H. SHORT, *Primary Examiner.*